Patented July 13, 1954

2,683,701

UNITED STATES PATENT OFFICE 2,683,701

PLASTICIZED POLYVINYL CHLORIDE POLYMERS

Joachim Dazzi, Dayton, Ohio, and Joseph R. Darby, Webster Groves, Mo., assignors to Monsanto Chemical Company, St. Louis, Mo., a corporation of Delaware No Drawing. Application November 28, 1952,
Serial No. 323,124

10 Claims. (Cl. 260—31.8)

This invention relates to compositions comprising polymers of vinyl halides and relates more particularly to compositions comprising vinyl chloride polymers plasticized with adducts of certain fumarates and esters of certain higher fatty acids.

A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other desirable properties of an ideal polyvinyl chloride composition such as low volatility, color and heat stability, water absorption, etc.

Now we have found that very good flexibility without sacrifice of temperature stability and low volatility is imparted to vinyl chloride polymers when there are employed as plasticizers adducts of certain alkyl or alkoxyalkyl fumarates and certain aryl or aralkyl esters of unsaturated, non-hydroxylated, non-conjugated fatty acids having from 10 to 24 carbon atoms. Adducts of this type are obtainable by the addition reaction of the fumarates with appropriate esters of the higher fatty acids. Such adducts may be characterized as polycarboxylates in which from 1 to 4 moles of a fumarate selected from the class consisting of alkyl and alkoxyalkyl fumarates of from 6 to 20 carbon atoms is combined at the acid portion of one mole of an ester selected from the class consisting of aryl and aralkyl esters of non-conjugated, unsaturated, non-hydroxylated fatty acids of from 10 to 24 carbon atoms in which each aryl radical and each aralkyl radical has from 6 to 9 carbon atoms.

The addition products whch we have found to be particularly valuable as plasticizers for polyvinyl chloride may be represented by the formula:

$$T-CH_2COOY$$
$$\left[\begin{array}{c}CH.COOR\\CH_2.COOR'\end{array}\right]_n$$

in which T is selected from the class consisting of non-hydroxylated mono-olefinic radicals and non-hydroxylated un-conjugated polyolefinic radicals of from 8 to 22 carbon atoms, Y is selected from the class consisting of aralkyl and aryl radicals of from 6 to 9 carbon atoms, R and R' are selected from the class consisting of alkyl and alkoxyalkyl radicals of from 1 to 8 carbon atoms and $n$ is an integer of from 1 to 4.

Esters of fumaric acid which may be reacted with the higher fatty acid esters to yield the present adducts have the formula:

$$\begin{array}{c}CH.COOR\\R'OOC.CH\end{array}$$

in which R and R' are selected from the class consisting of alkyl and alkoxyalkyl radicals of from 1 to 8 carbon atoms. As illustrative of useful esters may be mentioned dimethyl, diethyl, dibutyl, di-n-amyl, bis-(2-ethylhexyl), dioctyl, bis-(2-methoxy-ethyl), bis-(3-ethoxypropyl) and bis-(3-methoxypropyl) fumarates. Mixed esters, e. g., esters derived from two different fatty alcohols or from mono-etherified glycols may be used. Examples of such mixed esters include ethyl butyl fumarate, n-butyl 2-ethoxyethyl fumarate, 2-methoxyethyl 4-ethoxybutyl fumarate, etc.

Higher unsaturated fatty acid esters useful for the present addition products have the general formula: $T.CH_2COOY$ in which T is an alkenyl radical of from 8 to 22 carbon atoms and Y is selected from the class consisting of aryl and aralkyl radicals of from 6 to 9 carbon atoms. As illustrative of esters having this general formula may be mentioned phenyl, cresyl, benzyl, 2-phenylethyl or 4-tolyl oleate, decylenate or undecylenate.

While isomeric mixtures are possible, and the position to which the fumarate residue is attached to the fatty acid ester is not known, the reaction of, e. g., one mole of phenyl undecylenate and one mole of a dialkyl fumarate such as dimethyl fumarate proceeds probably according to the scheme:

$$CH_2:CHCH_2(CH_2)_6CH_2COOC_6H_5 + CH.COOCH_3 \longrightarrow$$
$$CH_3.OOC.CH$$

$$\begin{array}{c}CH_2CH:CH(CH_2)_6CH_2COOC_6H_5\\|\\CH.COOCH_3\\|\\CH_2.COOCH_3\end{array}$$

The high reactivity of the fumarate often results in the introduction of more than one fumarate residue at the alkenyl portion of the higher fatty acid ester. Mixtures of adducts in which from 1 to 4 moles of a dialkyl fumarate have combined with one mole of an aryl or aralkyl oleate are generally valuable as polyvinyl chloride plasticizers. However, adducts in which an average of from, say, 1.3 to 2.5 moles of fumarate have added to 1 mole of the higher fatty acid ester are preferred in that at these fumarate concentrations good low temperature flexibility and volatility properties are demonstrated. As the fumarate content of the adducts increases, there is a tendency for a decrease in the flexibility properties of vinyl chloride polymers plasticized therewith, although even lower volatility values are attained.

The present adducts are generally valuable plasticizers for polyvinyl chloride and copolymers of at least 70 per cent by weight of vinyl chloride and up to 30 per cent by weight of an unsaturated monomer copolymerized therewith, for example vinyl acetate, vinylidene chloride, etc.

The present fumarate-fatty acid ester adducts are compatible with vinyl chloride polymers and show no exduation of plasticizer even at plasticizer content of up to 50 per cent. Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument & Manufacturing Company is used for this determination and expresses the hardness in units from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature, the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. The value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is the carbon absorption method of the Society of the Plastics Industry.

*Water resistance.*—The amount of water absorption and the amount of leaching that takes place when the plasticized composition is immersed in distilled water for 24 hours is determined.

The invention is further illustrated, but not limited, by the following examples:

*Example 1*

A mixture consisting of 94 g. (0.25 mole) of benzyl oleate and 114 g. (0.5 mole) of dibutyl fumarate was heated at a temperature of 254–300° C. for about 2 hours. Distillation of the resulting reaction product to remove material boiling below 229° C./1–2 mm. removed 43.6 g. of unreacted fumarate and gave as residue 158.1 g. of the viscous benzyl oleate-dibutyl fumarate adduct $n_D^{25}$ 1.4812. Based on the fumarate consumed the product represents an adduct in which an average of 1.14 moles of dibutyl fumarate have added to one mole of benzyl oleate.

Evaluation of the benzyl oleate-dibutyl fumarate adduct thus prepared was conducted by employing the testing procedures described above. Sixty parts of polyvinyl chloride and forty parts by weight of the adduct were mixed on a roll mill to a homogeneous blend. During the milling there was observed substantially no foaming and discoloration. A molded sheet of the mixture was homogeneous and substantially colorless. Testing of the molded sheet for low temperature flexibility according to the testing procedure described above gave a value of minus 29° C., which value denotes very good low temperature properties. Tests on the volatility characteristics of the plasticized composition gave a value of 3.42 per cent. The plasticized material had a hardness of 81 before the volatility test and a hardness of 80 after the volatility test. When subjected to heat at a temperature of 325° F. for a period of 30 minutes, the clarity and color of the molded product was substantially unchanged. Tests of the water resistance properties of the plasticized material employing the test procedures described above showed a solids loss value of only 0.01 per cent and a 0.40 per cent water absorption value.

Similar testing of benzyl oleate as a polyvinyl chloride plasticizer showed this ester to be completely incompatible with polyvinyl chloride.

*Example 2*

A mixture consisting of 131 g. (0.35 mole) of benzyl oleate and 151 g. (0.875 mole) of diethyl fumarate was brought to reflux (231° C.) within about 30 minutes and refluxing was continued for about another 5 hours. Distillation of the resulting reaction product at reduced pressure to remove material boiling below 250° C./1–2 mm. gave 274.9 g. of the viscous benzyl oleate-diethyl fumarate adduct, $n_D^{25}$ 1.4878. Evaluation of the adduct as a polyvinyl chloride plasticizer employing the method described above gave homogeneous, flexible films having a low temperature flexibility value of minus 10.1° C. and a volatility of 0.93 per cent. The plasticized product had a hardness of 82 before and after the volatility test and showed a solids loss of only 0.1 per cent and a 0.586 per cent water-absorption value.

*Example 3*

This example describes preparation and utilization of an adduct of dibutyl fumarate and the benzyl ester of a fatty acid known to the trade as "Acintol 42" and comprising a tall oil extract consisting of 42.5 per cent linoleic acid, 0.5 per cent linolenic acid, 54.0 per cent oleic acid and 3 per cent saturated acid.

A mixture consisting of 130 g. (0.35 mole) of said benzyl ester and 0.70 mole of dibutyl fumarate was heated in a nitrogen atmosphere at a temperature of from 220° C.–290° C. for about 1.5 hours and the reaction mixture submitted to fractionation at reduced pressure. Removal of material boiling below 212° C./0.4–0.6 mm. gave as residue 224.0 g. of adduct, $n_D^{25}$ 1.4836. Evaluation of the adduct as a polyvinyl chloride plasticizer employing the evaluation method described above, gave homogeneous, flexible films having a low temperature flexibility value of minus 49.1° C., a volatility value of 2.9 per cent, a hardness of 75 before and after the volatility test, a solids loss of 0.1 per cent and a water-absorption value of 0.33 per cent.

On the other hand, similar evaluation of the plasticizing efficiency of the benzyl ester of "Acintol" showed it to be completely incompatible with polyvinyl chloride at the 40 per cent concentration.

*Example 4*

An adduct of phenyl oleate and diethyl fumarate was prepared as follows:

A mixture consisting of 108 g. (0.3 mole) of the oleate and 129 g. (0.75 mole) of the fumarate was refluxed (180–250° C.) for about 2.5 hours. Distillation of the resulting reaction mixture gave a fraction B. P. 230–80° C./1–2 mm. which upon redistillation gave 78 g. of the substantially pure viscous phenyl oleate-diethyl fumarate adduct B. P. 220–60° C./1–2 mm. $n_D^{25}$ 1.4835. Evaluation of the plasticizing efficiency of the present adduct by the testing procedure of Example 1 gave homogeneous, flexible films having a low temperature flexibility value of minus 47.7° C., a volatility value of 4.34 per cent, a solids loss value of 0.154 per cent and a water-absorption value of 0.0416.

What we claim is:

1. A resinous composition comprising a vinyl chloride polymer plasticized with a polycarboxylate having the formula

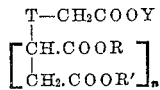

in which T is selected from the class consisting of non-hydroxylated mono-olefinic radicals and non-hydroxylated un-conjugated polyolefinic radicals of from 8 to 22 carbon atoms, Y is selected from the class consisting of aralkyl and aryl radicals of from 6 to 9 carbon atoms, R and R' are selected from the class consisting of alkyl and alkoxyalkyl radicals of from 1 to 8 carbon atoms and n is an integer of from 1 to 4.

2. A resinous composition comprising polyvinyl chloride plasticized with a polycarboxylate having the formula

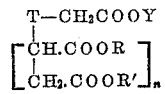

in which T is selected from the class consisting of non-hydroxylated mono-olefinic radicals and non-hydroxylated un-conjugated polyolefinic radicals of from 8 to 22 carbon atoms, Y is selected from the class consisting of aralkyl and aryl radicals of from 6 to 9 carbon atoms, R and R' are selected from the class consisting of alkyl and alkoxyalkyl radicals of from 1 to 8 carbon atoms and n is an integer of from 1 to 4.

3. A resinous composition comprising polyvinyl chloride plasticized with a polycarboxylate having the formula

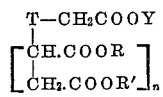

in which T is selected from the class consisting of non-hydroxylated mono-olefinic radicals and non-hydroxylated un-conjugated polyolefinic radicals of from 8 to 22 carbon atoms, Y is selected from the class consisting of aralkyl and aryl radicals of from 6 to 9 carbon atoms, R and R' are selected from the class consisting of alkyl and alkoxyalkyl radicals of from 1 to 8 carbon atoms and n is an integer of from 1 to 4, said polycarboxylate being from 5 to 50 per cent of the weight of the composition.

4. A resinous composition comprising a polyvinyl chloride plasticized with a polycarboxylate in which from 1 to 4 moles of a dialkyl fumarate in which each alkyl radical has from 1 to 8 carbon atoms is combined at the acid portion of one mole of phenyl oleate.

5. A resinous composition comprising a polyvinyl chloride plasticized with a polycarboxylate in which from 1 to 4 moles of a dialkyl fumarate in which each alkyl radical has from 1 to 8 carbon atoms is combined at the acid portion of one mole of benzyl oleate.

6. A resinous composition comprising a copolymer of at least 70 per cent by weight of vinyl chloride and up to 30 per cent by weight of an unsaturated monomer copolymerizable therewith, said copolymer being plasticized with a polycarboxylate having the formula

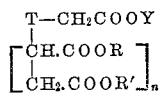

in which T is selected from the class consisting of non-hydroxylated mono-olefinic radicals and non-hydroxylated un-conjugated polyolefinic radicals of from 8 to 22 carbon atoms, Y is selected from the class consisting of aralkyl and aryl radicals of from 6 to 9 carbon atoms, R and R' are selected from the class consisting of alkyl and alkoxyalkyl radicals of from 1 to 8 carbon atoms and n is an integer of from 1 to 4.

7. A resinous composition comprising polyvinyl chloride plasticized with a polycarboxylate in which from 1 to 4 moles of diethyl fumarate is combined at the acid portion of one mole of benzyl oleate.

8. A resinous composition comprising polyvinyl chloride plasticized with a polycarboxylate in which 1 to 4 moles of diethyl fumarate is combined at the acid portion of one mole of phenyl oleate.

9. A resinous composition comprising polyvinyl chloride plasticized with a polycarboxylate in which from 1 to 4 moles of dibutyl fumarate is combined at the acid portion of the benzyl ester of a tall oil extract consisting essentially of a mixture of linoleic acid and oleic acid.

10. A resinous composition comprising polyvinyl chloride plasticized with a polycarboxylate in which from 1 to 4 moles of dibutyl fumarate is combined at the acid portion of benzyl oleate.

No references cited.